|| US009367106B2

(12) United States Patent
Alshinnawi et al.

(10) Patent No.: US 9,367,106 B2
(45) Date of Patent: Jun. 14, 2016

(54) PINOUT ADJUSTMENT RESPONSIVE TO SYSTEM ORIENTATION

(75) Inventors: Shareef F. Alshinnawi, Durham, NC (US); Gary D. Cudak, Creedmoor, NC (US); Edward S. Suffern, Chapel Hill, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 809 days.

(21) Appl. No.: 13/542,714

(22) Filed: Jul. 6, 2012

(65) Prior Publication Data
US 2014/0013093 A1 Jan. 9, 2014

(51) Int. Cl.
*G06F 9/00* (2006.01)
*G06F 9/24* (2006.01)
*G06F 15/177* (2006.01)
*G06F 1/22* (2006.01)
*G06F 1/18* (2006.01)

(52) U.S. Cl.
CPC .. *G06F 1/22* (2013.01); *G06F 1/18* (2013.01); *G06F 1/183* (2013.01); *G06F 1/184* (2013.01)

(58) Field of Classification Search
CPC . H05K 1/14; H05K 1/0295; H05K 2201/044; H05K 2201/09954; H05K 2201/10212; H05K 3/303; H05K 7/1487; G01C 17/00; G06F 1/183; G06F 1/184; G06F 1/18
See application file for complete search history.

(56) References Cited

U.S. PATENT DOCUMENTS

| 5,539,330 | A * | 7/1996 | McDermid | 326/39 |
| 6,654,941 | B1 | 11/2003 | Baumbach | |
| 6,667,561 | B2 * | 12/2003 | Baker | 257/786 |
| 6,693,817 | B2 * | 2/2004 | Brunelle | G01R 31/2886 324/756.02 |
| 6,789,151 | B1 * | 9/2004 | Benson et al. | 710/305 |
| 7,035,111 | B1 * | 4/2006 | Lin | G06F 1/18 361/748 |
| 7,293,135 | B1 * | 11/2007 | Warnakulasooriya et al. | 711/112 |

(Continued)

FOREIGN PATENT DOCUMENTS

GB 2423191 A 8/2006

OTHER PUBLICATIONS

TW200814614(A), "Method for detecting status of host and/or I/O peripherals in centralized computer system", English Abstract, Espacenet—Bibliographic data, Mar. 16, 2008, 2 pages.

(Continued)

*Primary Examiner* — Thomas Lee
*Assistant Examiner* — Zhipeng Wang
(74) *Attorney, Agent, or Firm* — Katherine S. Brown; Jeffrey L. Streets (57) ABSTRACT

A unit of information technology equipment (ITE), such as a compute node or a network switch, comprises a system board in communication with network connectors that selectively connect to a network interconnect, a gravity sensor for detecting a first orientation and a second orientation of the system board, and a basic input/output system (BIOS) in communication with the gravity sensor to receive a signal identifying whether the system board is in the first or second orientation. The ITE further comprises a network ASIC (application specific integrated circuit) that inverts the pinout of transmit and receive signals in the network connectors in response to a command from the BIOS indicating that the system board is in the second orientation. A system may comprise a first ITE in a first orientation that interlocks with a second ITE in a second orientation that is inverted 180 degrees from the first orientation.

19 Claims, 7 Drawing Sheets

(56) References Cited

U.S. PATENT DOCUMENTS

| | | | |
|---|---|---|---|
| 7,644,250 B2* | 1/2010 | Zimmerman | H01L 25/50 361/600 |
| 7,652,589 B2* | 1/2010 | Autor | G01C 17/00 312/223.5 |
| 8,041,875 B1 | 10/2011 | Shah et al. | |
| 8,131,902 B2* | 3/2012 | Karstens | G06F 1/183 345/649 |
| 8,478,912 B2* | 7/2013 | Liu | G06F 1/1613 710/316 |
| 2004/0193791 A1* | 9/2004 | Felton | G11B 33/126 711/112 |
| 2006/0174687 A1* | 8/2006 | Autor | G01C 17/00 73/1.77 |
| 2008/0002336 A1* | 1/2008 | Zimmerman | H01L 25/50 361/600 |
| 2008/0040423 A1 | 2/2008 | Chen et al. | |
| 2010/0085156 A1 | 4/2010 | Tucker | |
| 2010/0235484 A1 | 9/2010 | Bolan et al. | |
| 2011/0080973 A1 | 4/2011 | Ahmed et al. | |
| 2011/0199726 A1 | 8/2011 | Moser | |
| 2011/0215952 A1 | 9/2011 | Aria et al. | |
| 2012/0054478 A1* | 3/2012 | Curtis | G09G 3/20 713/2 |
| 2012/0200173 A1* | 8/2012 | Liu et al. | 307/116 |
| 2013/0108065 A1* | 5/2013 | Mullins et al. | 381/58 |

OTHER PUBLICATIONS

Pitner et al., IBM Systems and Technology Group, "EMI Sources from Mode Conversion in a Telco System High-Speed SERDES", 11400 Burnet Road, Austin, TX, 2010 Electronic components and Technology Conference, pp. 631-637.

* cited by examiner

PINOUT ADJUSTMENT RESPONSIVE TO SYSTEM ORIENTATION

BACKGROUND OF THE INVENTION

1. Field of the Invention

The present invention relates to high density configurations of information technology equipment.

2. Background of the Related Art

Modern data centers support the operation of large numbers of servers and other information technology equipment. Centralizing this equipment in a data center allows for efficiencies in both systems administration and facilities management. However, existing data centers have limited space for installing additional capacity.

A multi-server chassis is a common configuration of servers that operate a high number of servers in a small and efficient amount of space. A multi-server chassis, such as a blade server chassis, can accommodate and support multiple independent servers that are connected to each other and to a management module across a backplane through an Ethernet switch. The management module manages communication among the blade servers, as well as communication between the blade servers and an external Ethernet network.

Figure 1:
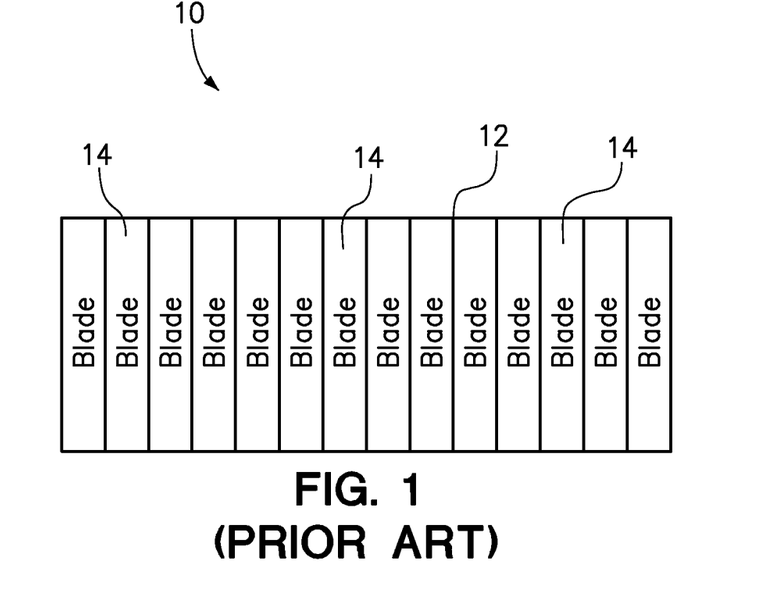
FIG. 1 is a diagram of the layout of a conventional blade server chassis.

FIG. 1 is a diagram of the layout of a conventional blade server system 10. As shown, the blade server system 10 includes a blade server chassis 12 having a plurality of adjacent bays for receiving a plurality of uniform blade servers 14. The blade server system will typically also include power modules, fan modules, a network interconnect, and a network switch that are not shown.

BRIEF SUMMARY OF THE INVENTION

One embodiment of the present invention provides a system comprising first and second units of information technology equipment. Both of the first and second units comprise a system board in communication with one or more network connectors that connect the system board to a network interconnect, a cover secured around the system board, a gravity sensor for detecting a first orientation and a second orientation of the system board, and a basic input output system (BIOS) in communication with the gravity sensor to receive a signal identifying whether the system board is in the first orientation or the second orientation. Both of the first and second units further comprise a network ASIC that inverts the pinout of transmit and receive signals in the one or more network connectors in response to a command from the BIOS indicating that the system board is in the second orientation. The cover of the first unit in a first orientation will interlock with the cover of the second unit in a second orientation that is inverted 180 degrees from the first orientation.

Another embodiment of the present invention provides a unit of information technology equipment (ITE), such as a compute node or a network switch. The ITE comprises a system board in communication with one or more network connectors that connect the system board to a network interconnect, a gravity sensor for detecting a first orientation and a second orientation of the system board, and a basic input output system (BIOS) in communication with the gravity sensor to receive a signal identifying whether the system board is in the first orientation or the second orientation. The ITE further comprises a network ASIC (application specific integrated circuit) that inverts the pinout of transmit and receive signals in the one or more network connectors in response to a command from the BIOS indicating that the system board is in the second orientation.

DETAILED DESCRIPTION OF THE INVENTION

One embodiment of the present invention provides a unit of information technology equipment (ITE), such as a compute node or a network switch. The ITE comprises a system board in communication with one or more network connectors that connect the system board to a network interconnect, a gravity sensor for detecting a first orientation and a second orientation of the system board, and a basic input output system (BIOS) in communication with the gravity sensor to receive a signal identifying whether the system board is in the first orientation or the second orientation. The ITE further comprises a network ASIC (application specific integrated circuit) that inverts the pinout of transmit and receive signals in the one or more network connectors in response to a command from the BIOS indicating that the system board is in the second orientation.

The system board may take many forms, such as the motherboard of a compute node or a switch module. In one embodiment, the gravity sensor is made part of the system board through attachment of the gravity sensor or integration of the gravity sensor into the design and fabrication of the system board. The system board will typically also include the BIOS and the network ASIC. Even the one or more network connectors may be secured to an edge of the motherboard in a manner that positions the network connectors for blind docking to the network interconnect, such as the midplane or backplane of a multi-server chassis.

The one or more connectors are well-known in the art. A common connector has a power contact, a ground contact, and a plurality of signal contacts in a two-dimensional array. The configuration of these contacts is predetermined for alignment and direct connection with similar contacts on the network interconnect. In fact, the network interconnect will have a similar connector in each bay of a multi-server chassis so that a server may be installed into any available bay. When a server is installed in a given bay, the connectors on the server blind dock with connectors of the network interconnect.

A "pinout" is a cross-reference between each individual contact of the connector and the function or signal associated with that contact. In order to facilitate the proper communication of signals or digital communications between a server and the network interconnect, as well as the proper supply of power from the network interconnect to a server, it is critical that the pinout of the server connectors match up with the pinout of the connectors on the network interconnect.

The gravity sensor may be a mercury switch, including a set of electrical contacts in a closed chamber containing a bead of mercury. When the orientation of the switch causes the mercury to flow into a first position that bridges the set of electrical contact, then the mercury closes a circuit that includes the electrical contacts. When the orientation of the switch causes the mercury to flow into a second position out of contact with the set of electrical contacts, then the circuit is open. Electrical detection of whether the circuit is open or closed enables the gravity sensor to produce a signal that identifies the orientation of the gravity sensor. By fixing the gravity sensor to a system board, system cover or other element that is itself in a fixed orientation relative to the system board, the output signal of the gravity sensor represents the orientation of the system board. In accordance with the present invention, it is not necessary for the gravity sensor to identify precise angular degrees of orientation or a large number of discrete angular positions. Rather, the gravity sensor need only differentiate between a first (upright) orientation of the system board and a second (upside down) orientation that is inverted approximately 180 degrees from the first (upright) orientation. The signal may be generated or the orientation detected at some intermediate orientation therebetween, such that the signal may indicate that the orientation of the system board is "more upright than upside down" or "more upside down than upright." Accordingly, the gravity sensor should be insensitive to slight tilts in datacenter flooring or rack mounting. Only a substantial inversion of the system board need be detectable. Furthermore, since the chassis receiving the system board will typically not accommodate the system board at varying angles (i.e., the bays are elongate with a long dimension having a fixed orientation), the system board is physically constrained to be installed in only two possible orientations. A mercury switch that functions as described above may be made with an elongate chamber that extends substantially up and down when the system board is in the first orientation, wherein the set of electrical contacts are positioned at one end of the elongate chamber.

The network ASIC of the present invention is responsible for implementing the pinout of the one or more connectors of the ITE. The pinout of the connectors on the network interconnect is fixed, such that the pinout of the connectors of the ITE must match. However, if the system board (i.e., compute node or switch) is inverted from a first orientation to a second orientation, then the network ASIC must invert the pinout of the one or more connectors. A complete inversion of the pinout involves reversing the transmit and receive signals, as well as the lane numbers. The net result of the user physically inverting the orientation of the system board and connectors, and the network ASIC logically inverting the pinout of those same connectors, is that the pinout of the connectors on the system board is unchanged and will still match up with the pinout of the connectors on the network interconnect.

A further embodiment of the invention includes a cover secured around the system board, where a front panel of the cover includes first and second lighted indicators. The first lighted indicator is positioned above the second lighted indicator in the first orientation and the second lighted indictor is positioned above the first lighted indicator in the second orientation. Using the signal from the gravity sensor, the present invention makes it possible to provide a consistent user interface regardless of the orientation of the cover, which is fixed with respect to the system board.

Accordingly, the first lighted indicator includes a branched lightpath having a distal end for emitting light from the front panel, a first proximal end terminating at a first light emitting diode that emits light of a first color, and a second proximal end terminating at a second light emitting diode that emits light of a second color. By contrast, the second lighted indicator includes a branched lightpath having a distal end for emitting light from the front panel, a first proximal end terminating at a third light emitting diode that emits light of the first color, and a second proximal end terminating at a fourth light emitting diode that emits light of the second color. Using this configuration, the first and third light emitting diodes are used in the first orientation, wherein the second and fourth light emitting diodes are used in the second orientation.

Optionally, the foregoing structure may be used such that the first color indicates a first alert condition and the second color indicates a second alert condition. In a further option, a third lighted indicator is disposed between the first and second lighted indicators and emits light of a third color without regard to the orientation of the compute node. This third color may indicate a third alert condition. Since the third lighted indicator remains vertically between the first and second lighted indicators regardless of the first or second orientation, it is not necessary to have a branched lightpath as with the first and second lighted indicators.

Yet another embodiment includes a display screen secured to the front panel of the cover, wherein the display screen inverts the display of information in response to the second orientation. A controller or driver that generates the display receives an orientation command that indicates which way to orient the display. For example, the gravity sensor may communicate the system board orientation to a baseboard management controller (BMC), which then commands the display controller or driver to orient the display so that the information or data will be displayed in a manner that presents a consistent interface to the user. Therefore, the information on the display is viewed as being upright regardless of whether the system board and cover are in the first orientation or the second orientation.

Embodiments of the present invention have a cover secured around the system board. The cover is made to have a profile relative to the plane of the system board, wherein the cover in a first orientation will interlock with another unit of information technology equipment having an identical cover in a second orientation that is inverted 180 degrees from the first orientation. For example, the tallest components on the system board are installed on a first end region of the system board to facilitate a cover profile that is a stepped profile with the highest step aligned with the first end region of the system board. The stepped profile of a first cover (i.e., a first ITE) in a first orientation may be interlocked with the stepped profile of a second cover (i.e., a second ITE) in a second orientation. In this manner, the first and second ITEs occupy less space when interlocked than when not interlocked.

Another embodiment of the present invention provides a system, comprising first and second units of information technology equipment. Both of the first and second units comprise a system board in communication with one or more network connectors that connect the system board to a network interconnect, a cover secured around the system board, a gravity sensor for detecting a first orientation and a second orientation of the system board, and a basic input output system (BIOS) in communication with the gravity sensor to receive a signal identifying whether the system board is in the first orientation or the second orientation. Both of the first and second units further comprise a network ASIC that inverts the pinout of transmit and receive signals in the one or more network connectors in response to a command from the BIOS indicating that the system board is in the second orientation. The cover of the first unit in a first orientation will interlock with the cover of the second unit in a second orientation that is inverted 180 degrees from the first orientation. It should be recognized that this system may optionally implement any one or more aspects of the information technology equipment (ITE) described herein.

In a further embodiment, the above system comprises a unique switch module. The switch module may include a system board in communication with one or more network connectors that connect the system board to the network interconnect, a cover secured around the system board, a gravity sensor for detecting a first orientation and a second orientation of the system board, a basic input output system (BIOS) in communication with the gravity sensor to receive a signal identifying whether the system board is in the first orientation or the second orientation, and a network ASIC that inverts the pinout of transmit and receive signals in the one or more network connectors in response to a command from the BIOS indicating that the system board is in the second orientation. The operation of these individual components and the interaction among the components is consistent with the foregoing embodiments of other units of ITEs. However, it should be clear that any of the connectors of a network interconnect may selectively receive either a compute node or a network switch, and that the compute node and switch may both invert their connectors dependent upon the orientation detected by an onboard gravity sensor.

Figure 2:
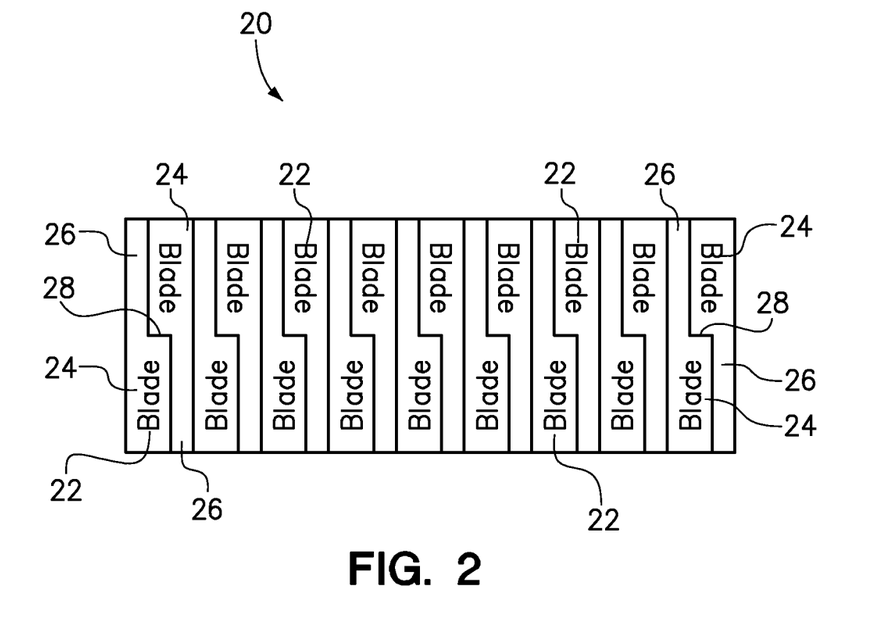
FIG. 2 is a diagram of the layout of a blade server chassis according to an embodiment of the present invention.

FIG. 2 is a diagram of the layout of a blade server chassis 20 according to an embodiment of the present invention. The chassis 20 has been filled with a plurality of blade servers 22 having a stepped profile. The blade servers shown in FIG. 2 may also be referred to as "dual-height" blade servers. For example, the cover of each server 22 has a tall or thick portion 24 over a first region of an internal motherboard (not shown) that supports the tallest components installed on the motherboard. The cover of each server 22 also has a short or thin portion 26 over a second region of an internal motherboard (not shown) that supports the remaining, shorter components installed on the motherboard. The "tall" or "short" dimension may be considered to be the distance along a z-axis, wherein the system board defines an x-y plane. As shown here, the first and second regions comprise about half of the vertical side dimension of the server, such that the "step" 28 is centered across the middle of front of the chassis 20. It should be recognized that the tallest components might be a heat sink mounted over a processor, memory modules, or an expansion card such as a graphics processor. As shown, space within the chassis can be conserved by inverting the orientation of every second dual-height blade server so that adjacent dual-height blade servers can be interlocked.

Figure 3:
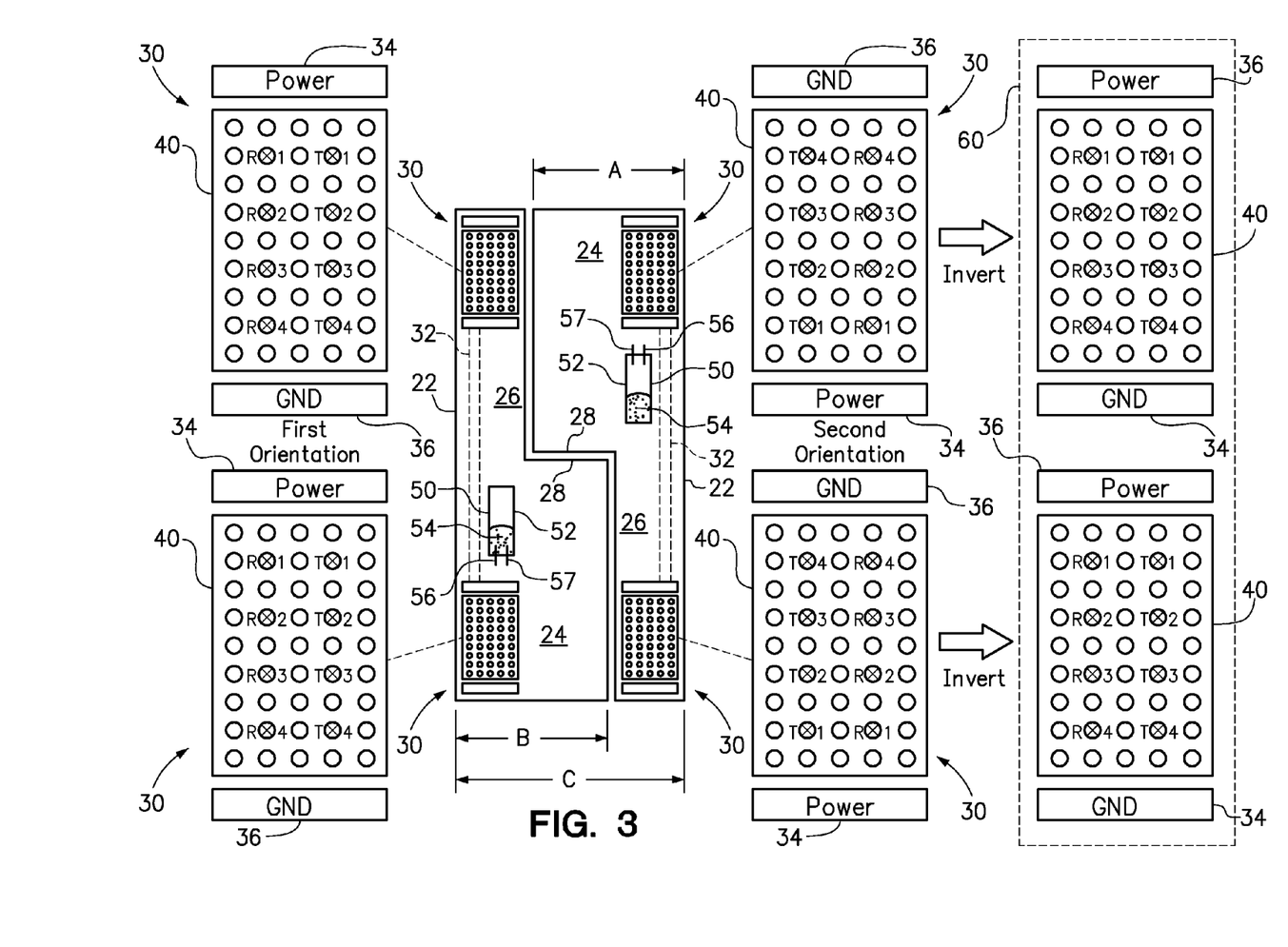
FIG. 3 is a diagram of the back edge of two adjacent blade servers showing the connector configurations that are dependent upon orientation of the individual blade servers.

FIG. 3 is a diagram of the back edge of two adjacent blade servers 22 showing connectors 30 having the connector configurations that are dependent upon the orientation of the individual blade servers 22. These two blade servers 22 represent the basic configuration that is repeated within the chassis. In the non-limiting example of FIG. 3, the left blade server 22 is in a first (upright) orientation and the right blade server 22 is in a second (upside down) orientation. The outline of each server 22 is established by a cover, such as a sheet metal housing. A system board 32 (shown in dashed lines) is inside the cover and is generally disposed along a straight side of the cover. The system board 32 supports components of various sizes, but the board will have a first region where the tallest components are mounted and allowed to extend outwardly into the taller portion 24 of the cover. The system board 32 also has a second region that has only shorter components, such that those shorter components can extend outwardly into the shorter portion 26 of the cover. A step 28 is preferably located about midway (or less) along the long dimension of the end of the servers. Accordingly, the stepped portions of the cover are able to "nest" or "interlock", as shown, such that the overall lateral dimension of the two interlocked ITEs (dimension C) is less than the sum of the largest lateral dimension of the right server (dimension A) and the largest lateral dimension of the left server (dimension B). This configuration saves space and increases the density of the servers within a chassis.

An enlarged view of each of the four connectors 30 is also provided in FIG. 3 immediately adjacent the servers. Each connector 30 includes a first electrical contact 34, a second electrical contact 36, and a two-dimensional array of signal contacts 40. Referring initially to the left server 22 in the first orientation, the two connectors (upper and lower) have the same pinout. The first electrical contact 34 is associated with power and the second electrical contact 36 is associated with ground. Within the array of signal contacts 40 (only a portion of the contacts are labeled for simplicity), the receive contacts Rx1 through Rx4 are on the left and the transmit contacts Tx1 through Tx4 are on the right, where Rx stands for "receive", Tx stands for "transmit", and the numbers are lane numbers.

Referring now to the right server 22 in the second orientation, the two connectors (upper and lower) also have the same pinout as each other, but both of these connectors are physically rotated 180 degrees from those of the left server. This is because the connectors are physically fixed to the system board 32 or cover of the server 22 and the right server has been rotated 180 degrees into the second orientation relative to the first orientation.

However, in accordance with embodiments of the present invention, the system board 32 includes a gravity sensor 50 having an elongate chamber 52 containing a mercury bead 54. A pair of electrical contacts 56, 57 extends into one end of the elongate chamber 52. With the left server in the first orientation, gravity causes the mercury bead 54 to settle at the end of the elongate chamber that has the electrical contacts. Since the mercury bead is electrically conductive, a circuit is completed (closed) between the two electrical contacts. An orientation signal may then be generated indicating whether the circuit is open or closed. Referring to the right server in the second orientation, the mercury bead settles at the end of the elongate chamber opposite of the electrical contacts such that the circuit is open.

Having received an orientation signal from the gravity sensor or associated circuits, the right server recognizes that the pinout of the connectors needs to be inverted in order to match the pinout of the network interconnect. A network ASIC (not show) in the right server receives the orientation signal and logically inverts the pinout. The inverted pinout is shown in region 60. It may be noted that the receive and transmit contacts and lane numbers have been reversed, and the power and ground contacts have also been reversed, relative to the system board. Accordingly, the logically inverted pinout of the physically inverted (right) server will result in a pinout that is the same as the pinout of the left server, and the pinouts of both servers will match the pinout of the connectors on the network interconnect.

Figure 4:
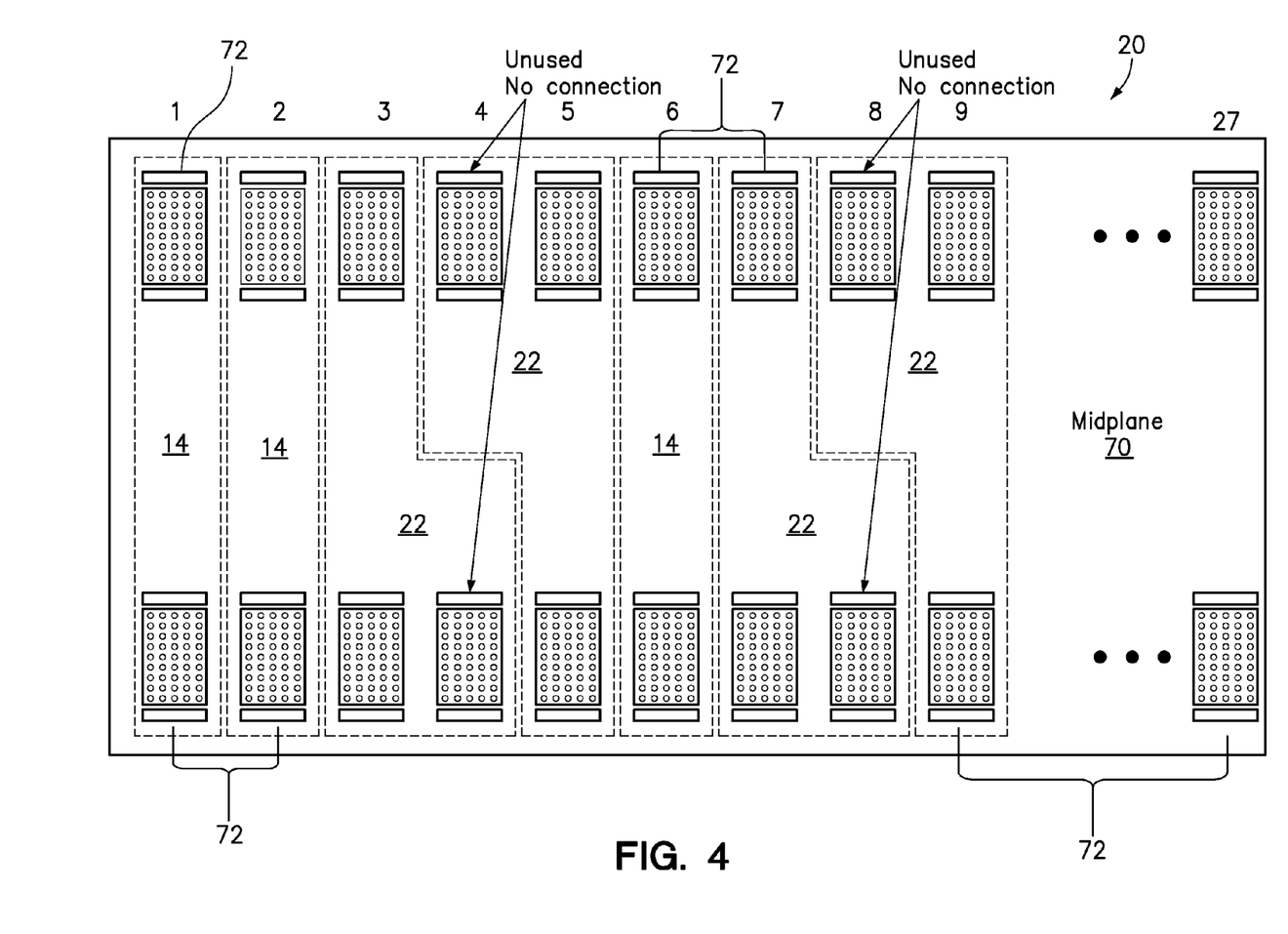
FIG. 4 is a diagram of a blade chassis having a midplane with evenly-spaced connectors capable of receiving a combination of single-height blades and dual-height blades.

FIG. 4 is a diagram of the blade chassis 20 having a midplance 70 with evenly-spaced connectors 72 capable of receiving a combination of single-height blades 14 and dual-height blades 22. The blade chassis 20 has 27 bays (27 sets of upper/lower connectors) and may support the use of up to 27 single-height (1U) blade servers. However, if a blade server has one or more components that are taller than will fit in a single-height (1U) cover, then that server would typically lapse over into an adjacent bay to the bay to which the server is actually connected. Since the adjacent bay would then typically be inaccessible for installation of a second blade server of any height, such a blade server might be considered to be a single-height (2U) blade server. A chassis have 27 bays would only accommodate up to 13 of such single-height (2U) blade servers.

However, a pair of interlocked dual-height blade servers 22 described herein may accommodate taller components without taking up as much space as a single-height (2U) blade server (not shown). Rather, two adjacent units of the dual-height blade servers may be interlocked or overlapped, such that the two blade servers fit in a space only three (3) bays wide. As a result, the 27 bay chassis will support the installation of up to eighteen dual-height ITEs/blade servers, where up to half of each server has a height of 2U and the other half of the server has a height of 1U.

As shown in FIG. 4, single-height (1U) blade servers 14 have been installed in Bay 1 and Bay 2. The connectors for a first dual-height ITEs/blade server in the first orientation have been connected into Bay 3, but the lower (2U) half of the server extends across the lower connector of Bay 4. Similarly, the connectors for a second dual-height ITEs/blade server in the second orientation have been connected into Bay 5, but the upper (2U) half of the server extends across the upper connector of Bay 4. Neither of the connectors in Bay 4 will be used in the configuration shown. It is not a requirement of the present invention that the dual-height ITEs/blade servers must be installed in interlocked pairs, but interlocking adjacent dual-height servers allows for maximum density. As shown, Bay 6 has a single-height (1U) blade server, Bay 7 has a dual-height ITEs/blade server in the first orientation, and Bay 9 has a dual-height ITEs/blade server in the second orientation. Neither of the connectors in Bay 8 will be used in this configuration. It should be appreciated that the embodiments of the present invention allow combinations of single-height and dual-height ITEs/blade servers in the same chassis.

Figure 5:
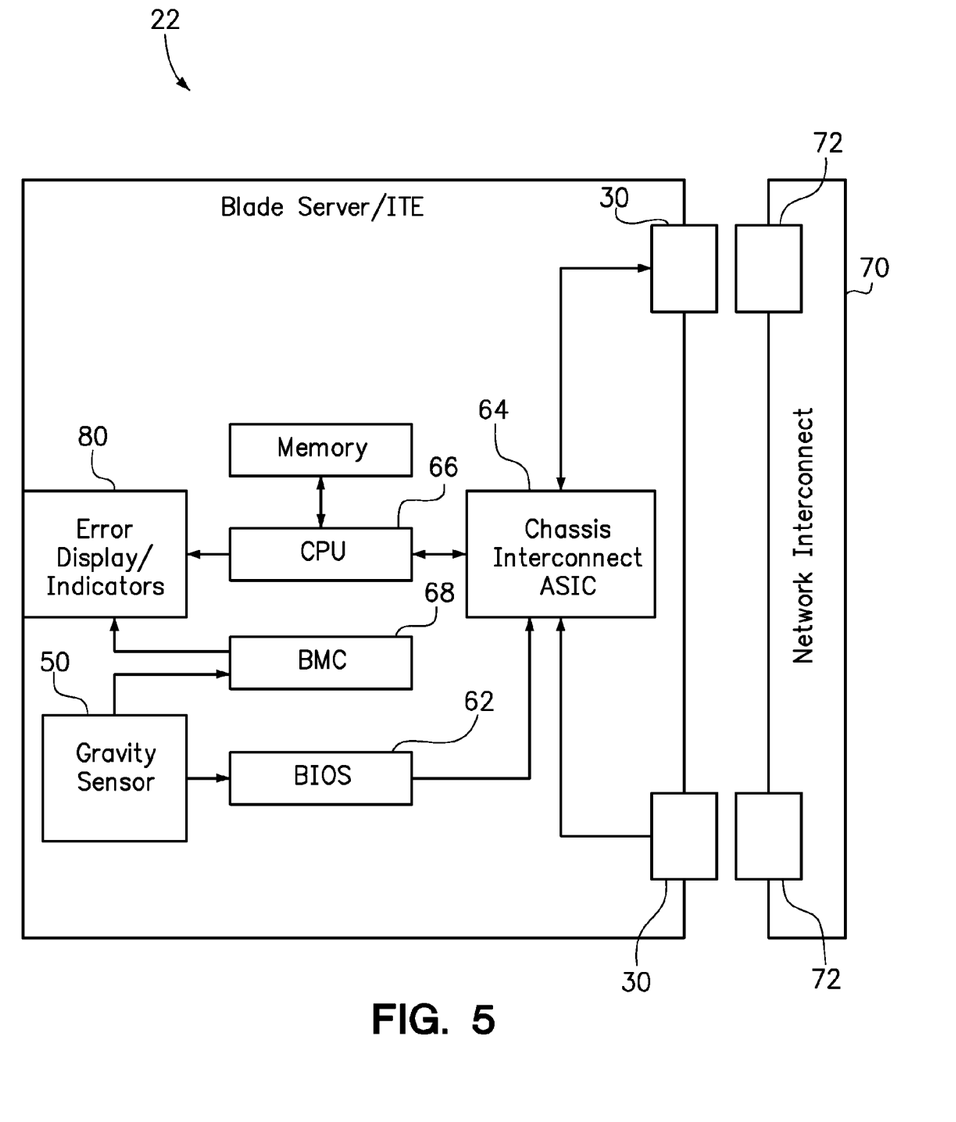
FIG. 5 is a block diagram of a blade server according to an embodiment of the present invention.

FIG. 5 is a block diagram of an ITE or blade server 22 according to an embodiment of the present invention. The gravity sensor circuit 50 is read by the BIOS 62. In the example of FIG. 3, if the gravity sensor circuit 50 is closed then the server is in a first orientation and if the gravity sensor circuit 50 is open then the server is in a second orientation. When initializing the ITE 22, the BIOS 62 sends a command to the network ASIC 64 to indicate whether the respective server 22 is the first orientation or the second orientation. If the server is in the second (inverted) orientation, then the ASIC 64 inverts the pinout of both of its connectors 30 (i.e., reverses the transmit and receive signals as well as the lane numbers). Accordingly, when the CPU 66 attempts to transmit or receive packets over the connectors 30 to the network interconnect 70, the pinout of the server connectors 30 match the pinout of the connectors 72 on the network interconnect.

In accordance with another embodiment, a baseboard management control (BMC) 68 also reads the gravity sensor circuit 50 and instructs an error display 80 whether the server 22 is in the first orientation or the second orientation. As a result, the error display 80 may invert its lighted indicators, as discuss in relation to FIGS. 8 and 9 below.

Figure 6:
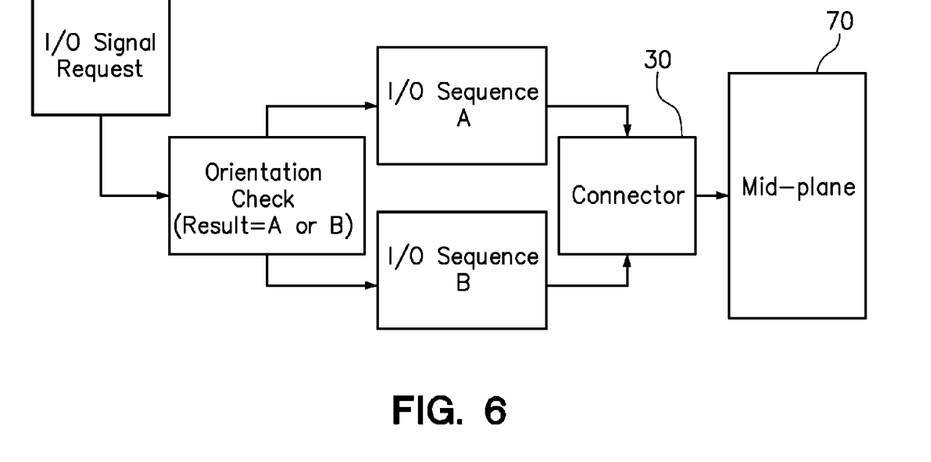
FIG. 6 is a logic diagram for transmitting output signals from a blade server.

FIG. 6 is a logic diagram for transmitting output signals from a blade server. An I/O signal request is generated by the processor or the network ASIC. The orientation of the system board and connector 30 is checked in accordance with the signal from the gravity sensor (see FIG. 5). If the system board is in the first orientation (A), then the network ASIC produces an I/O sequence A that is sent to the connector 30 for communication to the midplane 70. Alternatively, if the system board is in the second orientation (B), then the network ASIC produces an I/O sequence B that is sent to the connector 30 for communication to the midplane 70. The difference between I/O sequence A and I/O sequence B reflects the reversal of the transmit and receive contacts and the reversal of the lane numbers.

Figure 7:
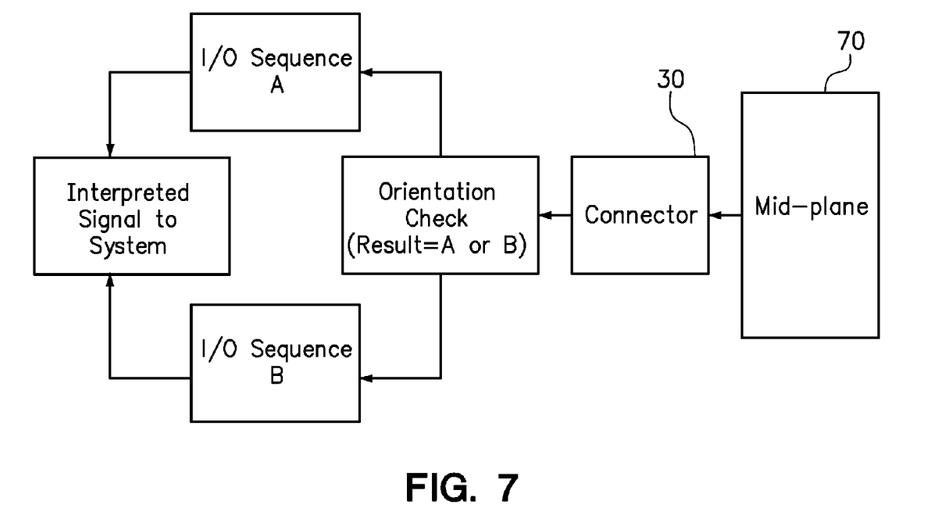
FIG. 7 is a logic diagram for receiving input signals to a blade server.

FIG. 7 is a logic diagram for receiving input signals from the midplane 70 to the connector 30 and eventually to a blade server. If the system board is in the first orientation (A), then the network ASIC passes I/O sequence A to the processor. Alternatively, if the system board is in the second orientation (B), then the network ASIC passes I/O sequence B to the processor.

Figure 8:
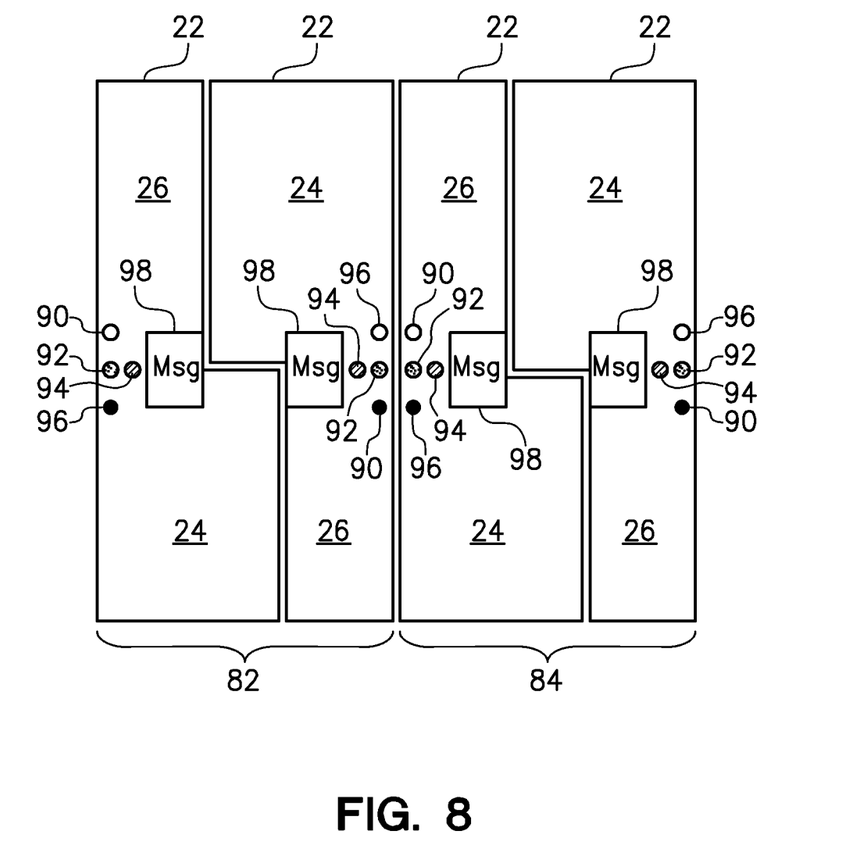
FIG. 8 is a diagram of the front edge or face of four adjacent blade servers showing the display configurations that are dependent upon orientation of the individual blade servers.

FIG. 8 is a diagram of the front edge or face of four adjacent blade servers 22 showing the display configurations that are dependent upon orientation of the individual blade servers. The left-most pair 82 of the blade servers 22 are interlocked and the right-most pair 84 of the blade servers 22 are interlocked in the same manner as in FIGS. 2 and 3. However, the lighted indicators 90, 92, 94, 96 and the display 98 on the front face of each server 22 are fixed to the cover of the blade servers 22, such that the orientation of the lighted indicators and the display is changed when there is a change in the orientation of the server 22. However, one embodiment of the present invention operates the lighted indicators and the display in a manner that inverts aspects of the lighted indicators and display so that the user interface remains mostly the same regardless of server orientation. For example, a first alert may indicate that maintenance is required. In the upright servers 22 (those with region 26 above region 24) the first alert may be a blue light in the lighted indicator 90, which is positioned at the top of the group of lighted indicators. In the inverted (upside down) servers 22 (those with region 24 above region 26) the first alert may be a blue light in the lighted indicator 96, which is now positioned at the top of the group of lighted indicators. Similarly, a second alert may be a green light in the lighted indicator 96 of the upright server, and a green light in the lighted indicator 90 of the inverted (upside down) servers. Furthermore, the information or message displayed in the display 98 of each server must be properly oriented for the user to read regardless of the orientation of the server. This produces the most consistent interface for the user. However, accomplishing this consistent user interface requires modifying the function behind the lighted indicators and display in accordance with the server orientation as indicated by the gravity sensor (see FIGS. 3 and 5).

Figure 9:
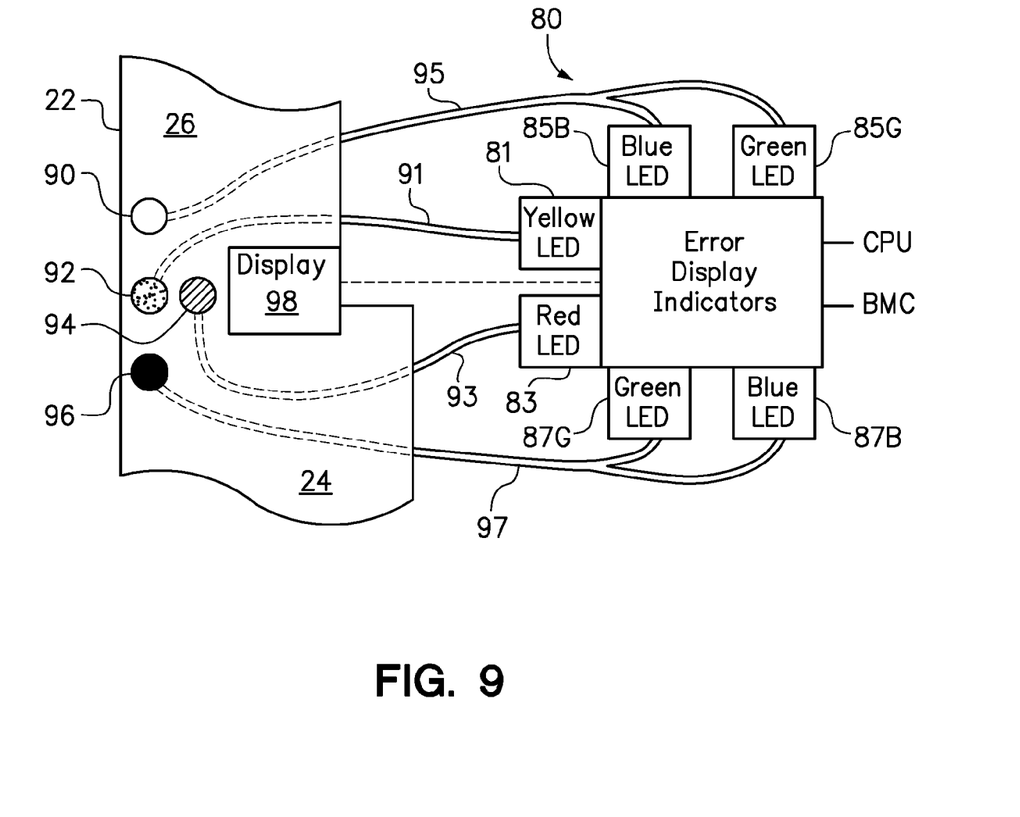
FIG. 9 is a diagram of an apparatus for inverting error indicator lights on the front edge or face of a blade server.

FIG. 9 is a diagram of an apparatus 80 for inverting the lighted indicators 90, 92, 94, 96 and the display 98 on the front edge or face of a blade server 22 (shown here in the first (upright) orientation). As a first matter, two lighted indicators 92, 94 are physically positioned between the top indicator 90 and the bottom indicator 96, and most preferably along the centerline of the server 22 between the short region 26 and the tall region 24. Accordingly, these lighted indicators may be associated with a single LED and represent a single alert regardless of server orientation. Here, a yellow LED 81 directs light into a lightpipe 91 that passes the light to the lighted indictor 92, which may be a clear lens. Similarly, a red LED 83 directs light into a lightpipe 93 that passes the light to the lighted indictor 94. In the present embodiment, these LED/lightpipe/indicator combinations operate the same without regard to orientation, though it would be possible to invert these two lighted indicators in the same manner as to be described for the top and bottom lighted indicators.

The (top) lighted indicator 90 is aligned with a distal end of a lightpipe 95 that is branched to have a first proximal end receiving light from a blue LED 85B and a second proximal end receiving light from a green LED 85G. The (bottom) lighted indicator 96 is aligned with a distal end of a lightpipe 97 that is branched to have a first proximal end receiving light from a green LED 87G and a second proximal end receiving light from a blue LED 87B. In operation, the BMC reads the server orientation from the gravity sensor and informs the unit 80 whether the server is in the first or second orientation. When the processor issues an alert to the unit 80, the unit must then determine which lighted indicators to use and the appropriate color. Assuming that the unit has been designed to respond to maintenance alerts by activating a blue light in the top position, the unit will respond to a maintenance alert by turning on the blue LED 85B if the server is in the first orientation or the blue LED 87B if the server is in the second orientation. Assuming that the unit has also been designed to respond to high load alerts by activating a green light in the bottom position, the unit will respond to a high load alert by turning on the green LED 87G if the server is in the first orientation or the green LED 85G if the server is in the second orientation. This inversion of the lighted indicators is consistent with the group of servers in FIG. 7. The data sent to display 98 is also inverted (rotated 180 degrees) in response to the server being in the second orientation. It should be appreciated that the lighted indicators just described will automatically normalize the interface for the user regardless of orientation and without manual adjustments. The user simply places any of the servers into any of the chassis bays in an appropriate orientation to fill up the chassis as shown in FIG. 2. The present invention accomplishes a higher density of servers with a consistent connector interface and optionally consistent error lights and display, yet does not require two different server configurations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A unit of information technology equipment, comprising:
    a system board in communication with one or more network connectors that connect the system board to a network interconnect;
    a gravity sensor for detecting a first orientation and a second orientation of the system board;
    a basic input output system (BIOS) in communication with the gravity sensor to receive a signal identifying whether the system board is in the first orientation or the second orientation; and
    a network ASIC that inverts the pinout of transmit and receive signals in the one or more network connectors in response to a command from the BIOS indicating that the system board is in the second orientation.

2. The unit of information technology equipment of claim 1, wherein each of the one or more network connectors has a plurality of signal contacts, a power contact, and a ground contact.

3. The unit of information technology equipment claim 1, wherein the each of the one or more network connectors is configured for direct connection to the network interconnect.

4. The unit of information technology equipment claim 1, wherein the network interconnect is selected from a midplane and a backplane.

5. The unit of information technology equipment of claim 1, wherein the network ASIC inverts the pinout by reversing the transmit and receive signals and the lane numbers.

6. The unit of information technology equipment of claim 1, further comprising:
    a cover secured around the system board;
    a front panel of the cover including first and second lighted indicators, wherein the first lighted indicator is above the second lighted indicator in the first orientation and the second lighted indictor is above the first lighted indicator in the second orientation;
    wherein the first lighted indicator includes a branched lightpath having a distal end for emitting light from the front panel, a first proximal end terminating at a first light emitting diode that emits light of a first color, and a second proximal end terminating at a second light emitting diode that emits light of a second color; and
    wherein the second lighted indicator includes a branched lightpath having a distal end for emitting light from the front panel, a first proximal end terminating at a third light emitting diode that emits light of the first color, and a second proximal end terminating at a fourth light emitting diode that emits light of the second color; and
    wherein the first and third light emitting diodes are used in the first orientation, wherein the second and fourth light emitting diodes are used in the second orientation.

7. The unit of information technology equipment of claim 6, wherein the first color indicates a first alert condition and the second color indicates a second alert condition.

8. The unit of information technology equipment claim 6, further comprising:
    a third lighted indicator that is disposed between the first and second lighted indicators and emits light of a third color without regard to the orientation of the compute node.

9. The unit of information technology equipment of claim 6, further comprising:
    a display screen secured to the front panel of the cover, wherein the display screen inverts the display of information in response to the second orientation.

10. The unit of information technology equipment of claim 1, further comprising:
    a cover secured around the system board, wherein the cover has a profile relative to the plane of the system board, wherein the cover in a first orientation will interlock with another unit of information technology equipment having an identical cover in a second orientation that is inverted 180 degrees from the first orientation.

11. The unit of information technology equipment of claim 10, wherein the tallest components on the system board are installed on a first end region of the system board.

12. The unit of information technology equipment of claim 11, wherein the cover profile is a stepped profile with the highest step aligned with the first end region of the system board.

13. The unit of information technology equipment of claim 10, characterized in that the first and second compute nodes occupy less space when interlocked than when not interlocked.

14. The unit of information technology equipment of claim 1, wherein the system board is a motherboard of a compute node.

15. The unit of information technology equipment of claim 1, wherein the system board is a component of a switch module.

16. A system, comprising:
  first and second units of information technology equipment, each unit comprising:
    a system board in communication with one or more network connectors that connect the system board to a network interconnect;
    a cover secured around the system board;
    a gravity sensor for detecting a first orientation and a second orientation of the system board;
    a basic input output system (BIOS) in communication with the gravity sensor to receive a signal identifying whether the system board is in the first orientation or the second orientation; and
    a network ASIC that inverts the pinout of transmit and receive signals in the one or more network connectors in response to a command from the BIOS indicating that the system board is in the second orientation; and
  wherein the cover of the first unit in a first orientation will interlock with the cover of the second unit in a second orientation that is inverted 180 degrees from the first orientation.

17. The system of claim 16, wherein the network interconnect is a chassis midplane.

18. The system of claim 17, wherein the first unit and the second unit are compute nodes.

19. The system of claim 18, further comprising:
  a switch module, comprising:
    a system board in communication with one or more network connectors that connect the system board to the network interconnect;
    a cover secured around the system board;
    a gravity sensor for detecting a first orientation and a second orientation of the system board;
    a basic input output system (BIOS) in communication with the gravity sensor to receive a signal identifying whether the system board is in the first orientation or the second orientation; and
    a network ASIC that inverts the pinout of transmit and receive signals in the one or more network connectors in response to a command from the BIOS indicating that the system board is in the second orientation.

\* \* \* \* \*